US 6,671,447 B1

(12) United States Patent
Gehrke

(10) Patent No.: US 6,671,447 B1
(45) Date of Patent: Dec. 30, 2003

(54) OPTICAL FIBER ORGANIZER FOR ORGANIZING OPTICAL FIBER INSIDE OF A FIBER DUCT

(75) Inventor: Gary Curtis Gehrke, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 22 days.

(21) Appl. No.: 10/002,492

(22) Filed: Nov. 2, 2001

(51) Int. Cl.[7] ................................................. G02B 6/00
(52) U.S. Cl. ........................ 385/135; 385/134; 385/136; 385/137
(58) Field of Search ................................. 385/135, 137, 385/134, 136

(56) References Cited

U.S. PATENT DOCUMENTS

| | | | | |
|---|---|---|---|---|
| 5,570,450 A | * | 10/1996 | Fernandez et al. | 385/135 |
| 5,715,348 A | * | 2/1998 | Falkenberg et al. | 385/135 |
| 5,999,683 A | * | 12/1999 | Gustafsson | 385/136 |
| 6,044,194 A | * | 3/2000 | Meyerhoefer | 385/134 |
| 6,370,309 B1 | * | 4/2002 | Daoud | 385/135 |
| 6,381,393 B1 | * | 4/2002 | Matthews et al. | 385/134 |
| 6,456,772 B1 | * | 9/2002 | Daoud | 385/135 |

* cited by examiner

*Primary Examiner*—Brian Healy
*Assistant Examiner*—Daniel Petkovsek
(74) *Attorney, Agent, or Firm*—Michael Cammarata; Douglas Luftman

(57) ABSTRACT

An optical fiber organizing device is provided. The inventive fiber organizer includes a bracket preferably fittable inside an optical fiber duct of a telecommunications device and a plurality of retaining arms extending from the bracket dividing the main internal space into a plurality of internal sub-spaces. Each of the sub-spaces is adapted to retain bundles of optic fibers. The optical fiber organizer may be made from a single piece, for example, a single piece of stamped sheet metal. Alternatively, the retaining arms may be separate pieces made from resilient plastic. In either event, the retaining arms are preferably resilient and bendable to allow for intentional insertion and extraction of optical fibers while not allowing for the unintentional egress of fibers.

8 Claims, 11 Drawing Sheets

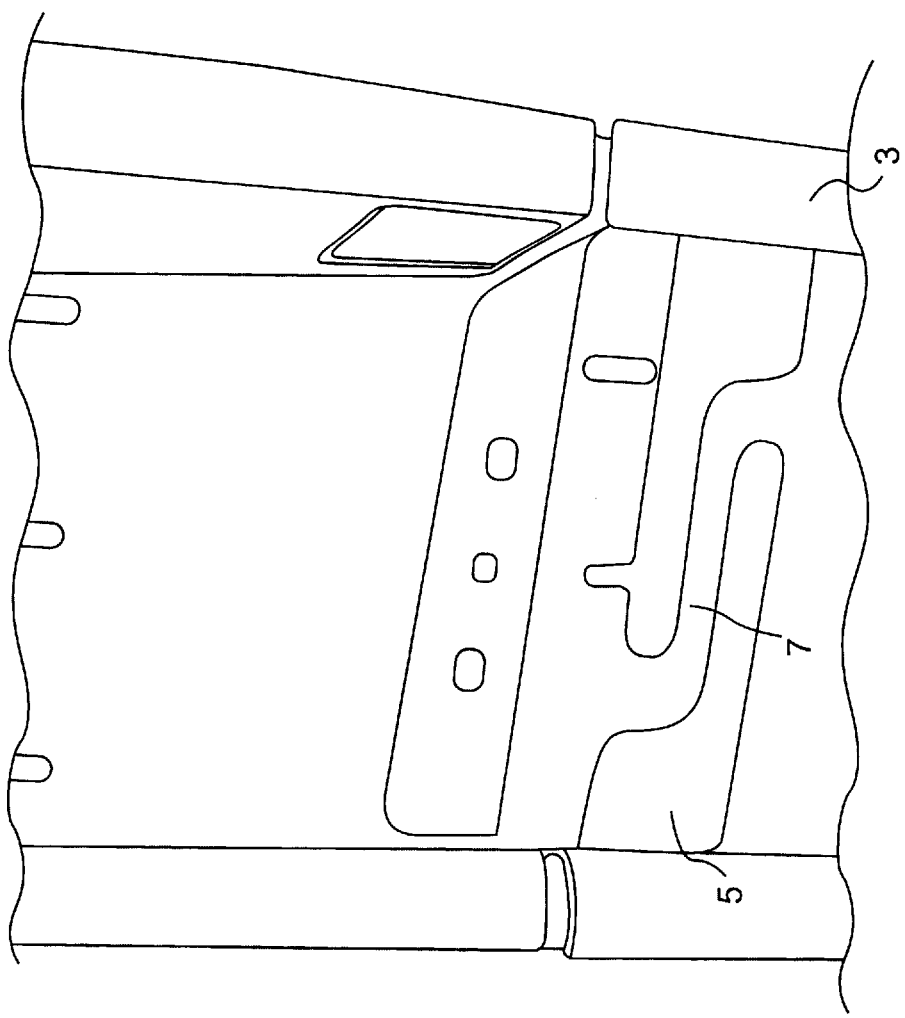

OPTICAL FIBER ORGANIZER FOR ORGANIZING OPTICAL FIBER INSIDE OF A FIBER DUCT

BACKGROUND OF THE INVENTION

1. Field of the Invention

The invention relates to devices which employ optical fiber; more specifically, the invention relates to a device that manages and organizes optical fibers for use in an optical telecommunications device.

2. Description of Related Art

Modem computer and telecommunications networks are constantly growing more complex and have an ever-expanding need for bandwidth (the ability to accept, process, and/or transmit information). Many of the components used in such networks utilize optical transceivers and optical fibers as the means of communicating among and within the various components.

One of the ways that optical network components have become more complex over the years is through an increased density of optical transceivers and fibers. Typically, the optical fibers employed in a telecommunications device are mounted at one end to a transceiver on a circuit board of some sort; the other end of the fiber exits the device to be connected to other devices or otherwise hook into a network. In some telecommunications devices that employ optical fiber, a duct is provided in which the various optical fibers are channeled. A routing device made by Cisco Systems only a few years ago would employ perhaps 25–50 fiber optic cables. By contrast, a modern Core Director≦ optical switch product made by CIENA Corporation (the assignee of the instant invention) can have 256 ports each having 2 optical fibers, for a total of up to 512 fibers per device.

A schematic view of a typical telecommunications node is shown in FIG. 1A. The exemplary node includes at least two telecommunications devices 1, for example, the CIENA Core Director≦ mentioned above. Devices 1 include a number of circuit boards or modules 2 to which optical fibers 4 are connected. The other ends of fibers 4 are passed away from the devices 1 and into fiber duct 3.

A perspective view of a fiber duct is shown in FIG. 1B. Duct 3 is a typically a pliable plastic column through which the optical fibers of the telecommunication device are snaked. A fiber retaining bracket 5 is fittable into duct 3 to keep optical fibers inside duct 3 from accidentally falling out of duct 3. Bracket 5 is provided with a channel 7 which is preferably disposed in the front of fiber duct 3. Channel 7 allows a technician the ability to insert or remove optical fibers from the interior of duct 3 while not allowing the unintentional emergence of a different fiber from the duct.

This solution is limited, because it only serves to retain optical fibers within the duct 3. A typical duct is approximately 4 inches square. A typical telecommunications device that has a fiber duct may employ up to 512 optical fibers. The use of a single space to retain all the fibers of a telecommunications device is less than desirable for several reasons. First, it is difficult to determine which fiber is which when it comes time to service the device if all 512 fibers are contained in the duct with no grouping or other organization. Moreover, the fibers that are towards the front of the channel tend to block the fibers towards the rear of the channel. As a result, it can be cumbersome to access the fibers that happen to be at the rear of the fiber duct owing to the potentially large number of fibers in front of them. Further, if one wishes to remove a fiber towards the rear of the duct, one must also remove a number of fibers in front of it, thereby making the process cumbersome and slow.

SUMMARY OF THE INVENTION

The invention includes an optical fiber organizer. In one embodiment, the inventive fiber organizer includes a bracket having a main internal space fittable inside an optical fiber duct of a telecommunications device. A plurality of retaining arms extend from the bracket dividing the main internal space into a plurality of internal sub-spaces, each of the sub-spaces adapted to retain bundles of optic fibers. The optical fiber organizer may be made from a single integral piece of material, for example, a single piece of sheet metal or plastic. Alternatively, the retaining arms may be separate pieces made from resilient plastic. In either event, the retaining arms are preferably resilient and bendable to allow for the intentional insertion and extraction of optical fibers while not allowing for the unintentional egress of fibers.

Gaps are preferably provided between adjacent retaining arms adapted to prevent unintentional egress of an optical fiber disposed within the sub-spaces. When an operator bends one of the retaining arms, the gap between the bent retaining arm and an adjacent retaining arm widens to allow optical fibers to be inserted or removed from at least one of the sub-spaces. Alternatively, the fiber organizer may be provided with a number of off-the-shelf fiber guides each defining a retaining space. Each fiber guide may preferably be provided with an entry point for receiving optical fibers.

In another embodiment, each of the fiber guides is detachable from the bracket and includes a mounting post to attach the fiber guide to the bracket. The bracket may further include a plurality of apertures adapted to receive the mounting posts of the fiber guides. The bracket may also be provided with one or more additional apertures for mounting the bracket inside the fiber duct.

BRIEF DESCRIPTION OF THE DRAWINGS

FIG. 1B is a perspective view of a conventional optical fiber retaining bracket installed in a fiber duct.

DETAILED DESCRIPTION OF THE EMBODIMENTS

Description of the invention will now be given of the invention with reference to FIGS. 2–6. It should be noted that the figures are exemplary in nature and are meant in no way to limit the scope of the invention.

Figure 1A:
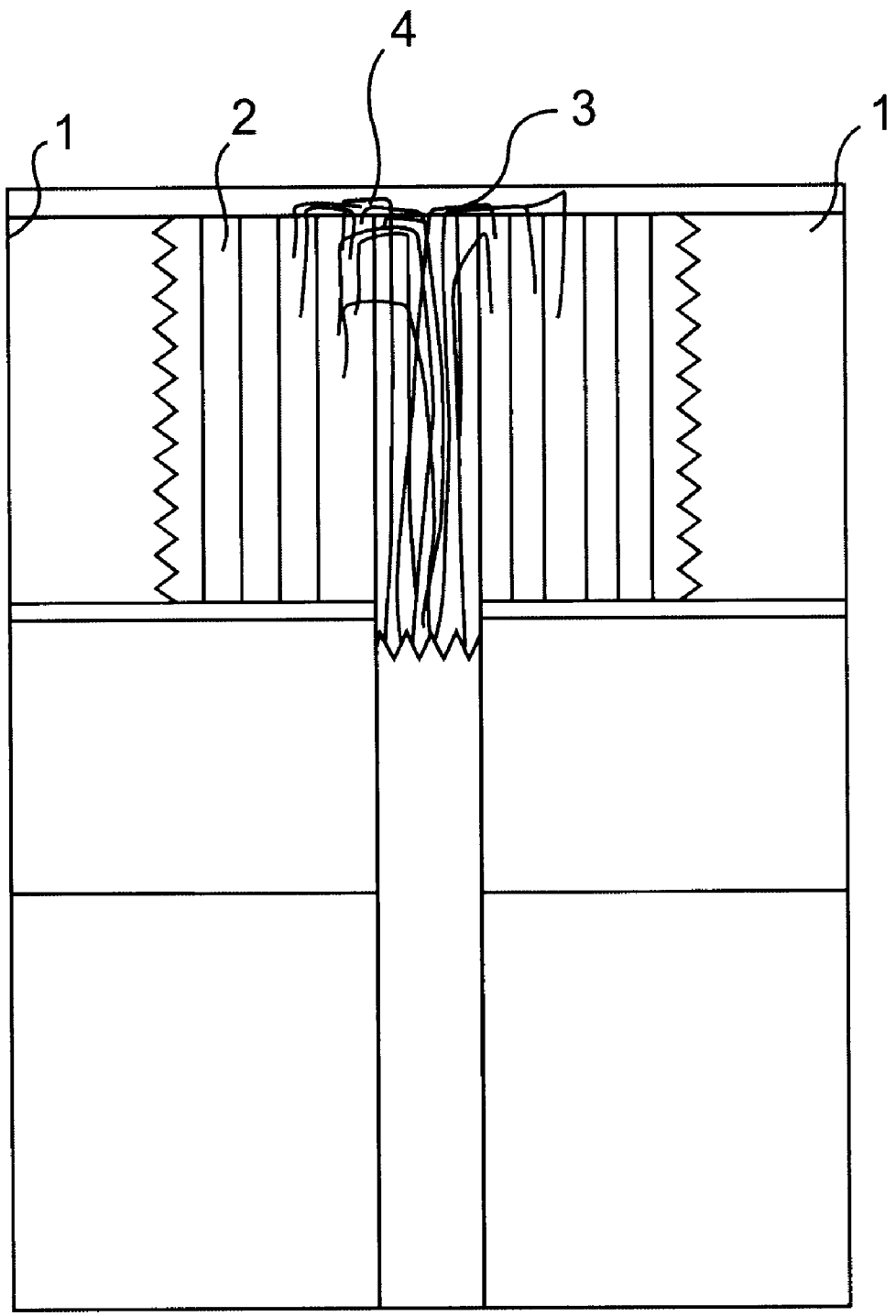
FIG. 1A is a schematic view of a telecommunications node that employs optical fiber and a fiber duct to which the invention is applicable.
Figure 2:
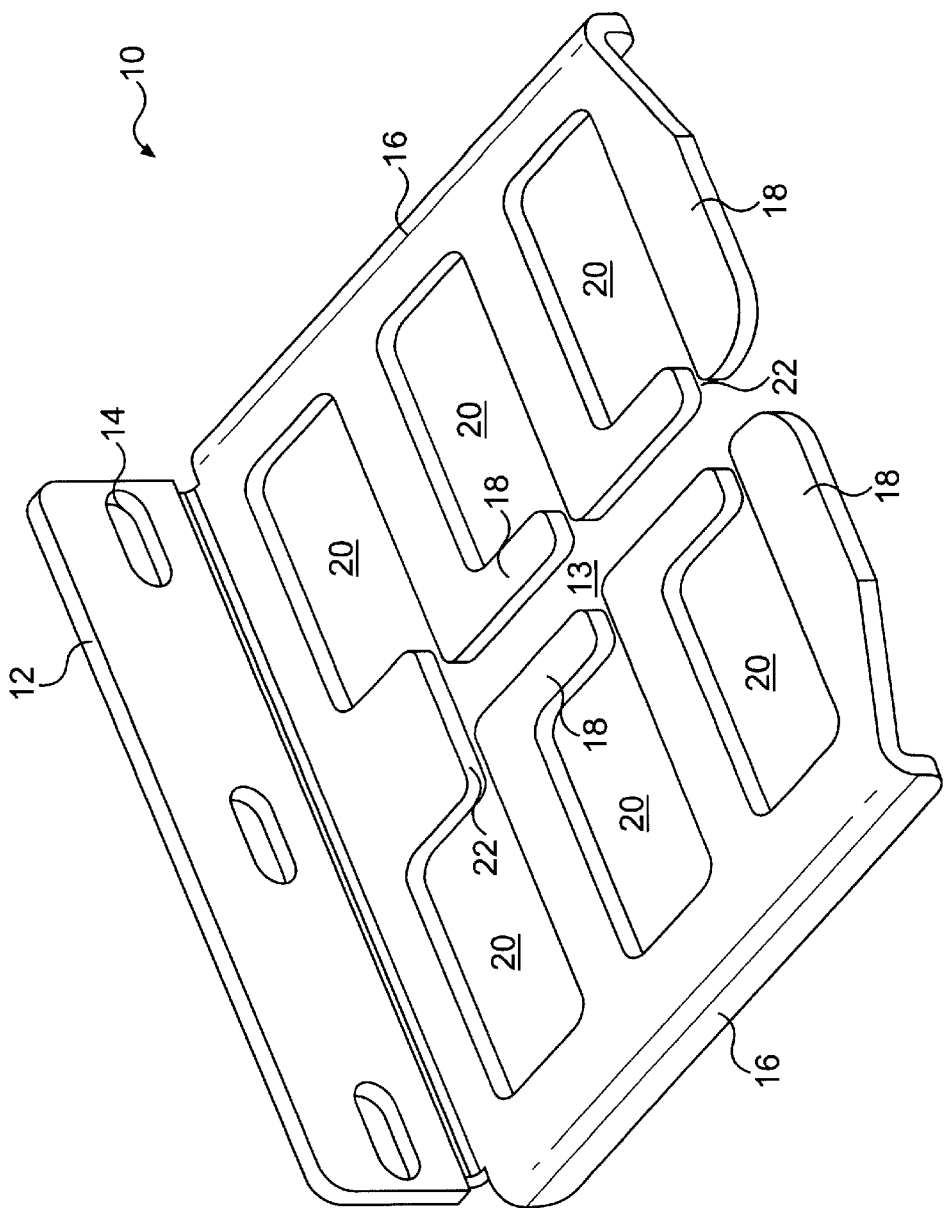
FIG. 2 is a perspective view of one embodiment of an optical fiber organizer in accordance with the invention.
Figure 3:
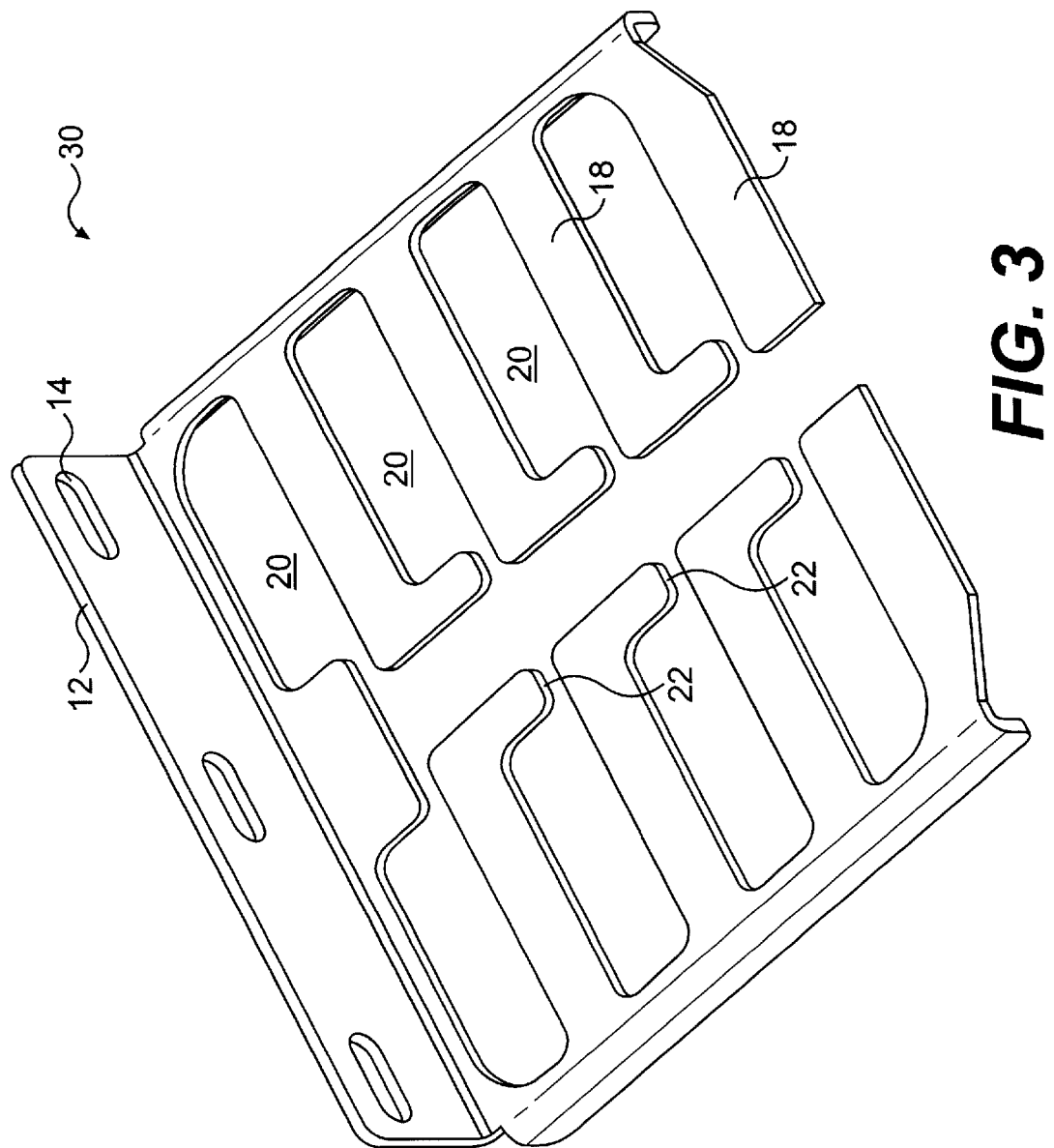
FIG. 3 is a perspective view of a second embodiment of an optical fiber organizer in accordance with the invention.

As mentioned above, it is desired to organize the optical fibers within a fiber duct so that they are not all together in one disorganized mess in the space of the duct. As shown in FIG. 2, fiber organizer 10 includes a mounting bracket 12 with mounting holes 14. Typically, organizer 10 may be mounted on the inside of a fiber duct with screws or bolts (not shown). Mounting bracket 12 includes side arms 16, which fit inside the side walls of the fiber duct. Side walls 16 and the rear of bracket 12 generally define a space 13. Extending from side walls 16 and the rear of bracket 12 are a plurality of retaining arms 18. Each retaining arm 18 is curved or bent in such a way that it sections off a portion or sub-space 20 of the space 13. The boundaries of a sub-space 20 may include one or more adjacent retaining arms 18, an associated side arm 16, and/or a rear portion of bracket 12. A gap 22 is provided between adjacent retaining arms 18 to allow for the entry and removal of optical fibers into and out of a corresponding sub-space 20.

Fiber organizer 10 is preferably made with at least some resilient parts. Preferably, at least retaining arms 18 are made resilient so that a technician can simply bend a given arm or arms in order to access, insert, or remove specific fibers in a given sub-space 20. In one contemplated embodiment, the entire organizer is made from a single piece of sheet metal. Any other resilient (yet not permanently deformable) material such as plastic, rubber, or the like may be employed.

A very similar embodiment to that shown in FIG. 2 and described above is shown in FIG. 3 Fiber organizer 30 is substantially identical to organizer 10 except that organizer 30 has eight sub-spaces for fiber retention whereas fiber organizer 10 has six. Both organizers 10 and 30 have either straight or substantially L-shaped planar retaining arms 18.

Figure 4:
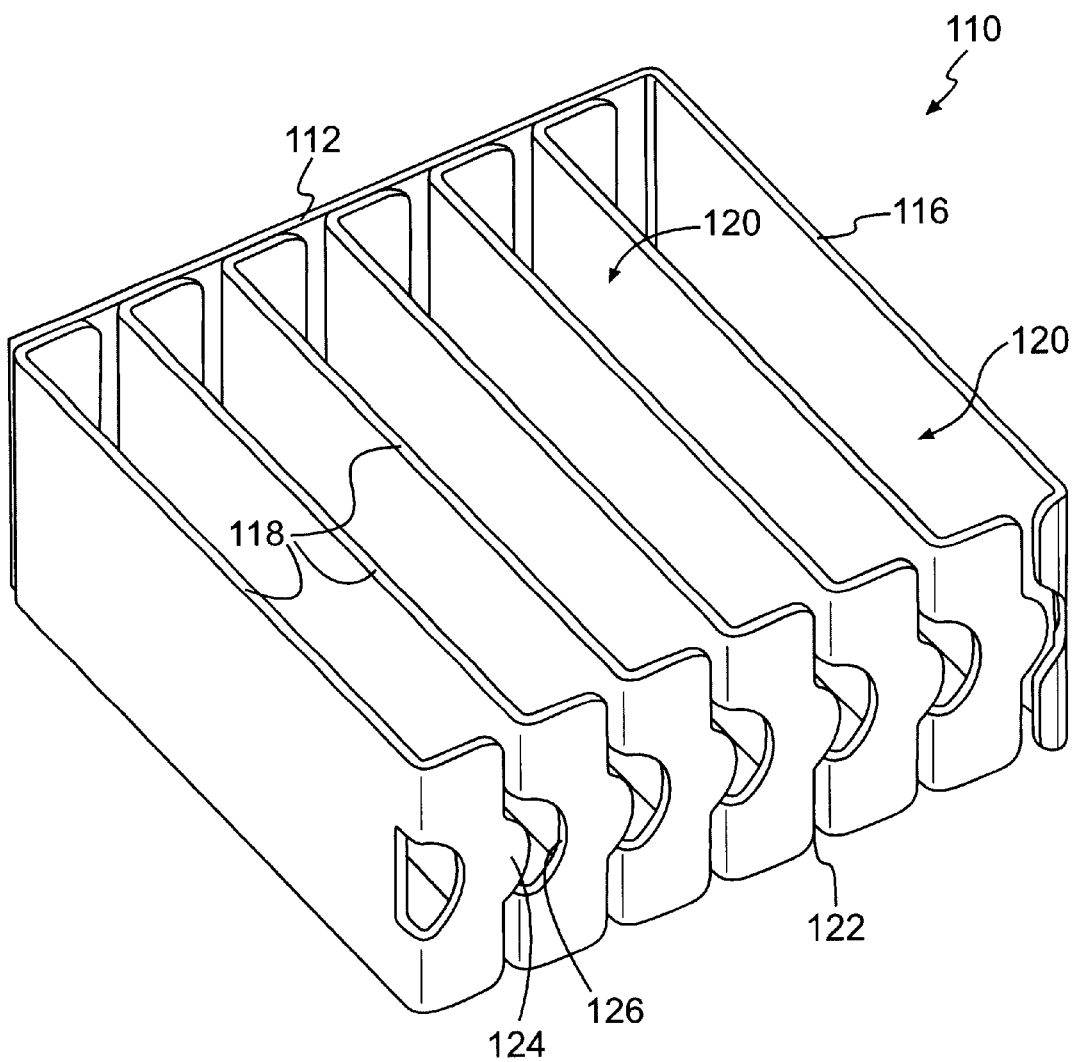
FIG. 4 is a perspective view of a third embodiment of an optical fiber organizer in accordance with the invention.

FIG. 4 depicts a third embodiment of the invention in the form of fiber organizer 110. It, too, includes a bracket 112 with at least one side arm 116. In the prior embodiments, the retaining arms 18 are substantially flat. Here, arms 118 divide the central space into vertical sub-spaces 120, because arms 118 are substantially perpendicular to the plane of organizer 110. That is, each arm 118 is relatively planar, and the basic plane of each arm is roughly 90° from the overall plane of bracket 112. As with the prior embodiments, gaps 122 are provided between adjacent arms 118 to allow for the intentional entry and removal of optical fibers within sub-spaces 120. In the specific organizer shown in FIG. 4, the gap is made more effective at preventing unintentional egress of fibers by providing a tab 124 and a corresponding cutout 126 on retaining arms 118. Each arm 118 is provided on one side with a tab 124 and on the other side with a cutout 126. The tab of one arm 118 corresponds to the cutout of an adjacent arm 118. The provision of cutout 126 also allows a technician the ability to obtain a better finger grip on tab 124 when trying to move a retaining arm out of the way to in order to access the optical fibers disposed within. Retaining arms 118 are preferably made resilient as explained above.

Figure 5:
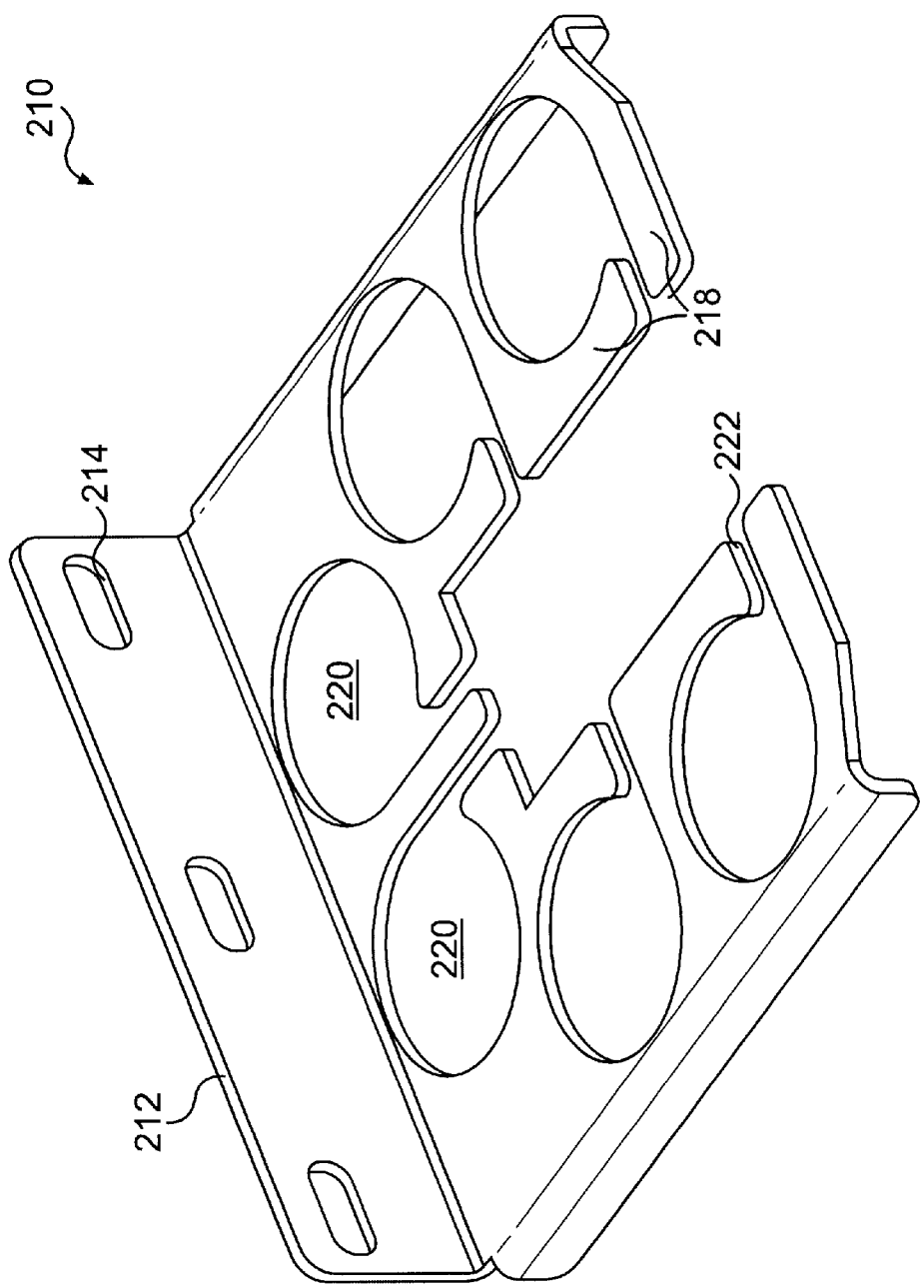
FIG. 5 is a perspective view of a fourth embodiment of an optical fiber organizer in accordance with the invention.

Another embodiment is shown in FIG. 5. The embodiment of FIG. 5 is similar to that of FIGS. 2–3 in that it is substantially planar. Fiber organizer 210 includes a bracket 212 and mounting holes 214. Retaining arms 218 subdivide the bracketed area into sub-spaces 220. Gaps 222 are provided between adjacent retaining arms for the same reasons as explained above. The main difference between fiber organizer 210 and the previous embodiments is that the sub-spaces 220 defined by retaining arms 218 are round here instead of the more rectangular shapes shown previously.

A fifth embodiment is shown in FIGS. 6A–E. Rather than fabricating a multi-pronged, multi-bend piece of metal or plastic such as those shown in FIGS. 2–5, the fiber organizer 310 of FIG. 6 is much simpler to manufacture, because it utilizes an existing off-the-shelf component. Like the above embodiments, fiber organizer 310 includes a mounting bracket 312 having mounting holes 314 and side arms 316. However, instead of being provided with integral retaining arms as above, the invention is meant to work with existing attachable fiber guides 318. These fiber guides 318 are currently manufactured by Richco, Inc. and are currently used to hang cables or fibers along the interiors of devices. They have not been used in fiber ducts, and they have not been used in groups such as disclosed here.

Figure 6A:
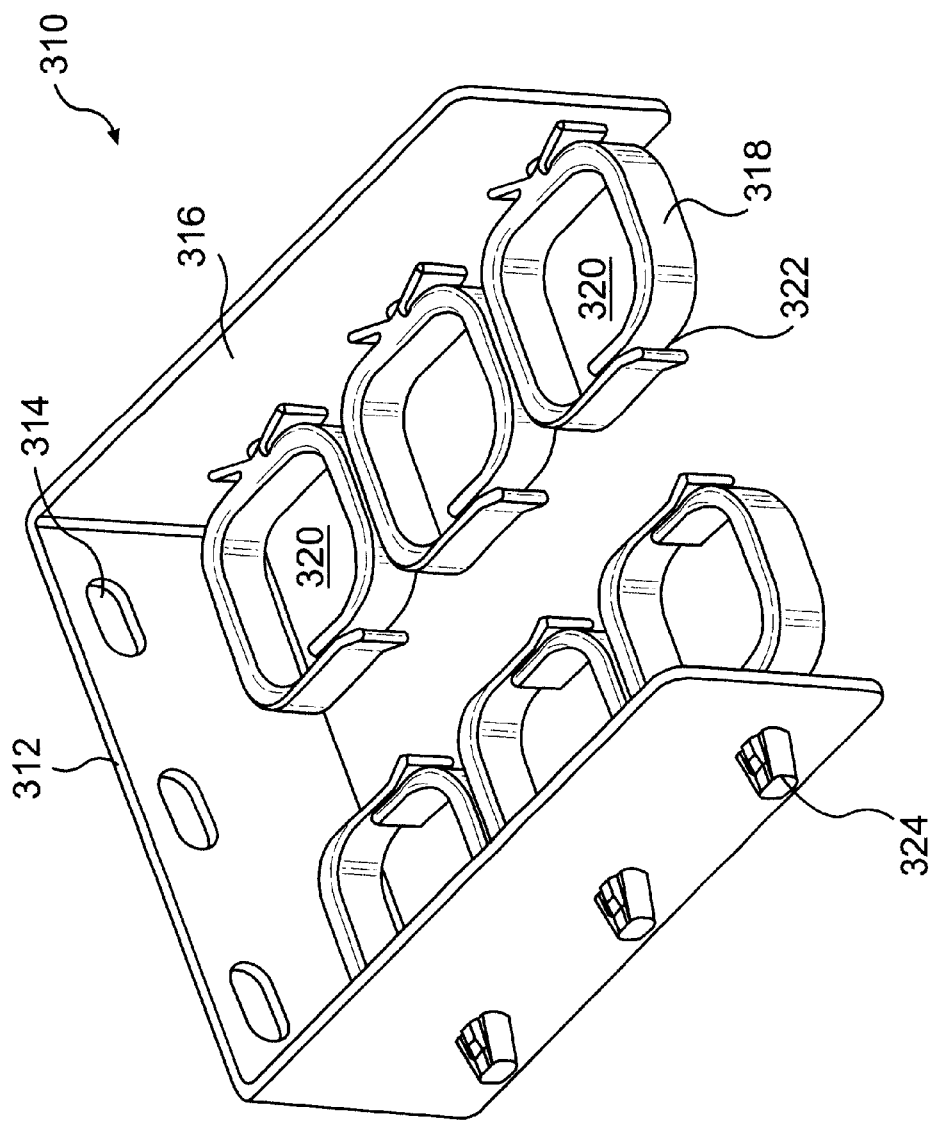
FIG. 6A is a perspective view of a fifth embodiment of an optical fiber organizer in accordance with the invention.
Figure 6B:
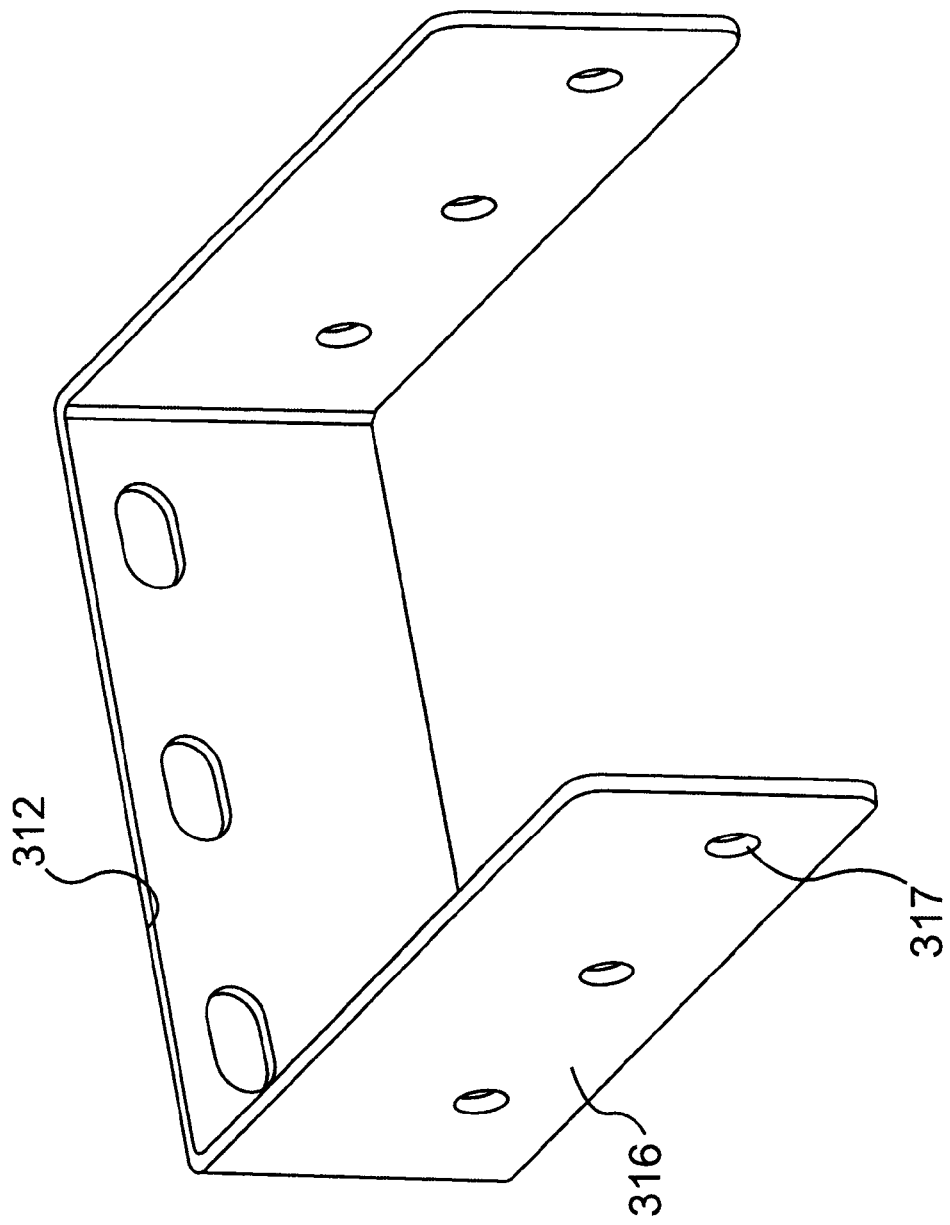
FIG. 6B is a perspective view of a bracket of the fifth embodiment shown in FIG. 6A.
Figure 6C:
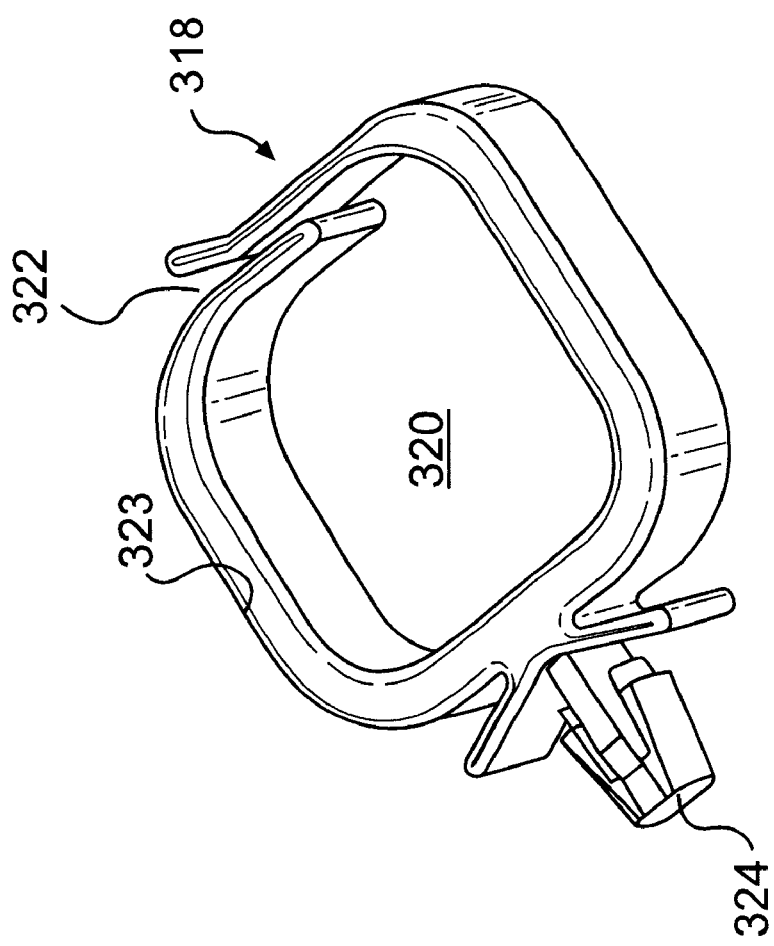
FIG. 6C is a perspective view of a fiber guide of the fifth embodiment shown in FIG. 6A.

As shown in FIG. 6C, fiber guide 318 is provided with a retaining ring 323 which surrounds and defines a retaining space 320. Ring 323 is provided with a gap 322 to allow entry and egress of fibers to and from retaining space 320. Fiber guide 318 also has a mounting post 324 substantially opposite gap 322. Mounting post 324 is used to secure fiber guide 318 to bracket 312 at apertures 317 (see FIG. 6B).

Figure 6D:
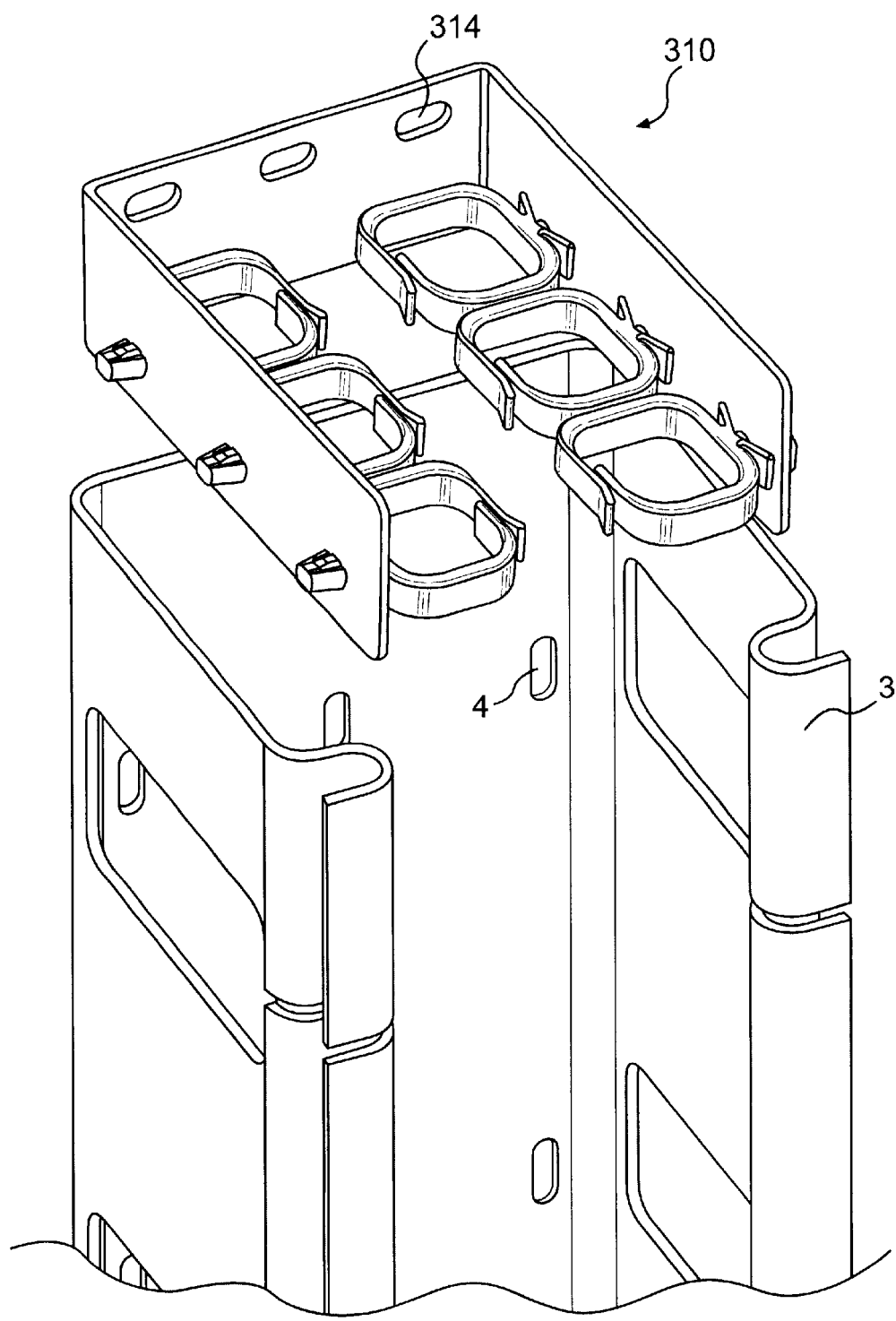
FIG. 6D is a perspective view of the optical fiber organizer shown in FIG. 6A being inserted into a fiber duct.
Figure 6E:
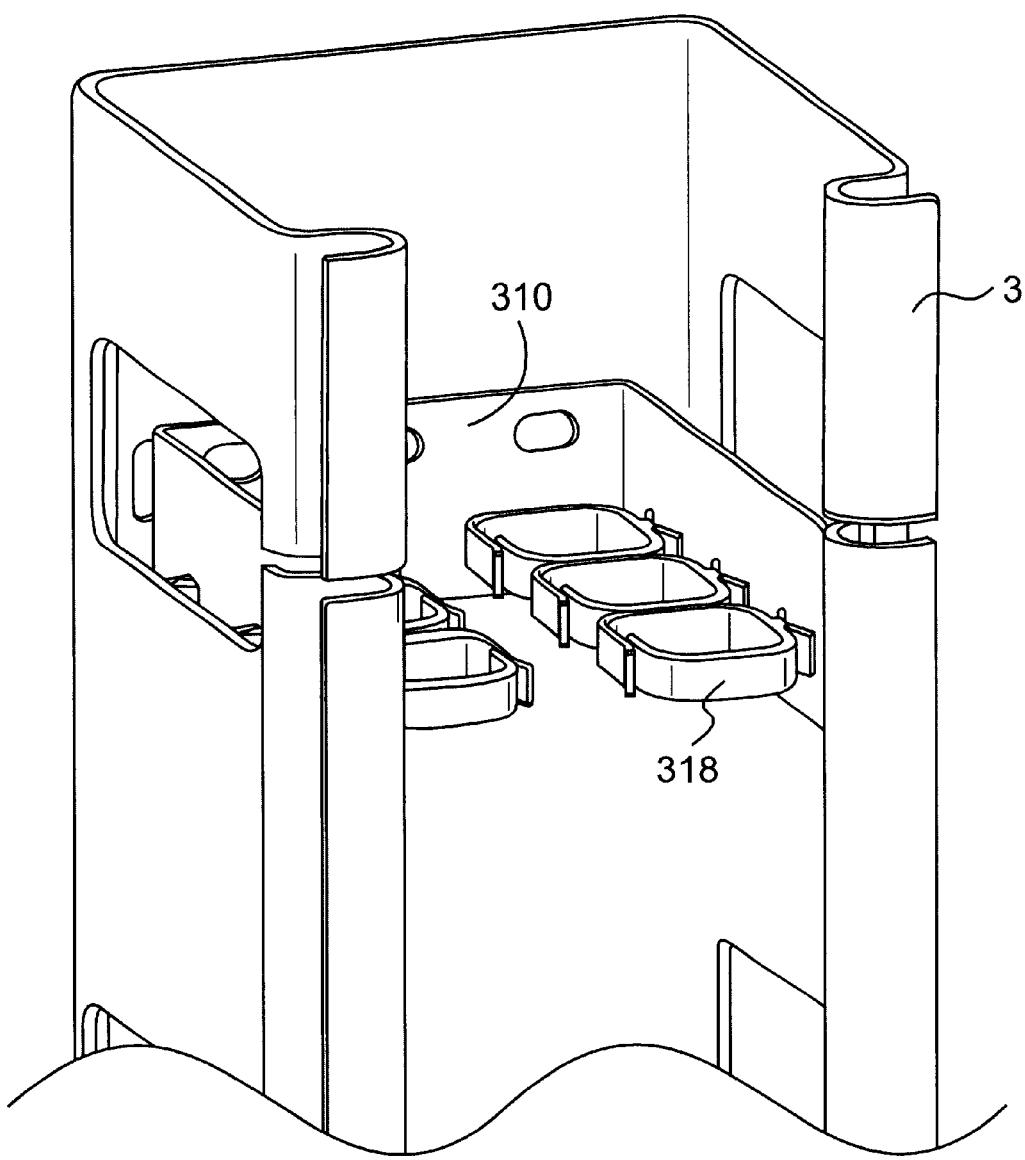
FIG. 6E is a perspective view of the optical fiber organizer shown in FIG. 6A disposed in a fiber duct.

Once assembled, as shown in FIGS. 6D and E, fiber organizer 310 is inserted into fiber duct 3. The fiber organizer is preferably mounted to duct 3 via mounting holes 314 being attached to fiber duct holes 4 (see FIG. 6D). When secured inside the fiber duct, fiber organizer 318 provides six discrete areas (or any convenient number) in which optical fibers may be disposed.

The invention is not limited to the above description. For example, the above examples of the inventive fiber organizer are provided with six or eight sub-spaces. However, the invention is not limited to any specific number of sub-spaces. Any convenient number of retaining arms or fiber guides and apertures may be provided without departing from the invention. Further, the geometry of the sub-spaces and even the organizer itself is not critical. All of the organizers shown have a generally square profile because current fiber ducts are square in cross-section. However, should other fiber ducts be developed in the future with different geometries, a fiber organizer like that described above would be equally applicable and would be within the scope of the invention. Therefore, if a round fiber duct is implemented, a circular organizer like that of the instant invention would be within the scope of the invention. Similarly, if a hexagonal—or any other shaped—fiber duct is implemented, the invention is equally adaptable. The overall shape of the fiber duct, and thus the organizer bracket, is not critical.

The invention is not limited in scope by the above description but rather by the claims appearing below.

What is claimed is:

1. An optical fiber organizer, comprising:
a bracket fittable inside an optical fiber duct of a telecommunications device, said bracket having side arms that partially define a main internal space of said bracket; and
a plurality of retaining arms extending from said bracket and dividing the main internal space and, thereby, the optical fiber duct into a plurality of internal sub-spaces, each of the internal sub-spaces being adapted to retain and organize bundles of optic fibers.

2. An optical fiber organizer according to claim 1, wherein said optical fiber organizer is made from a single piece of resilient material.

3. An optical fiber organizer according to claim 1, wherein said optical fiber organizer is made from a single piece of stamped sheet metal.

4. An optical fiber organizer according to claim 1, wherein at least said retaining arms are made from resilient plastic.

5. An optical fiber organizer according to claim 1, wherein said retaining arms are resilient and bendable to allow for intentional insertion and extraction of optic fibers.

6. An optical fiber organizer according to claim 5, further comprising gaps provided between adjacent retaining arms adapted to prevent unintentional egress of an optical fiber disposed within said sub-spaces, wherein when an operator bends one of said retaining arms, said gap between said bent retaining arm and an adjacent of said retaining arms widens to allow optical fibers to be inserted or removed from at least one of said sub-spaces.

7. An Optical fiber organizer according to claim 1, said bracket having a shape and size substantially co-extensive with the inside of the optical fiber duct.

8. An optical fiber organizing device, comprising:

a bracket attachable inside an optical fiber duct of a telecommunications device; and a plurality of resilient fiber guides attached to said bracket, each of said fiber guides having a retaining loop for consolidating optical fibers and a break in said retaining loop to allow entry and removal of optical fibers from within said retaining loop, wherein each of said fiber guides is detachable from said bracket and further includes a mounting post to attach said fiber guide to said bracket, and wherein said bracket further includes a plurality of apertures adapted to receive said mounting posts of said fiber guides.

\* \* \* \* \*